United States Patent

[11] 3,627,238

[72] Inventor Bruce E. Menn
 Woodland Hills, Calif.
[21] Appl. No. 829,060
[22] Filed May 29, 1969
[45] Patented Dec. 14, 1971
[73] Assignee Lear-Siegler, Inc.
 Santa Monica, Calif.

[54] SPEED COMMAND GENERATION SYSTEM FOR VERTICAL DESCENT CONTROL
 30 Claims, 4 Drawing Figs.
[52] U.S. Cl. .................................................. 244/77 D, 244/77 A
[51] Int. Cl. .................................................. B64c 13/18
[50] Field of Search .......................................... 244/77, 77 D, 77 A, 77 E; 343/108

[56] References Cited
 UNITED STATES PATENTS
 2,664,254 12/1953 Hendrickson ............... 244/77 D

| 3,112,905 | 12/1963 | Greene | 244/77 D |
| 3,147,424 | 9/1964 | Miller | 244/77 D X |
| 3,362,661 | 1/1968 | Booth et al. | 244/77 D |

Primary Examiner—Milton Buchler
Assistant Examiner—Jeffrey L. Forman
Attorney—Christie, Parker & Hale ABSTRACT: A vtol or vistol aircraft has a control system for generating safe speed commands during letdown as a function of instantaneous descent angle. The speed commands generated are preferably fed to a flight director system which produces commanded speed error signals for airborne instrument panel display or for coupling to an automatic flight control system. In one form of the invention, speed commands are derived from a speed schedule wherein desired vector speed is a function of the tangent of the descent angle. In another form of the invention, speed commands are derived from a speed schedule wherein desired vertical speed is a function of the descent angle.

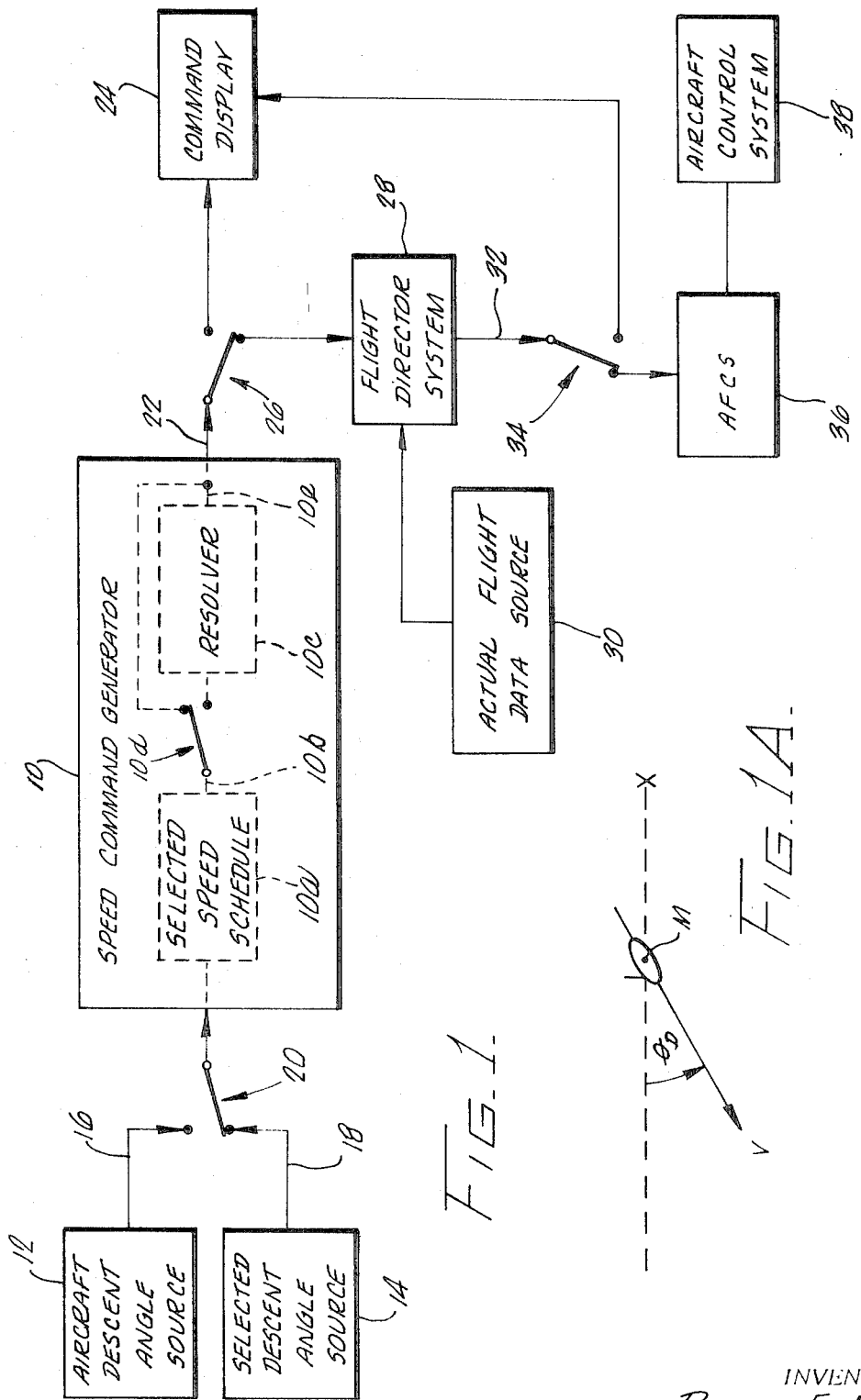

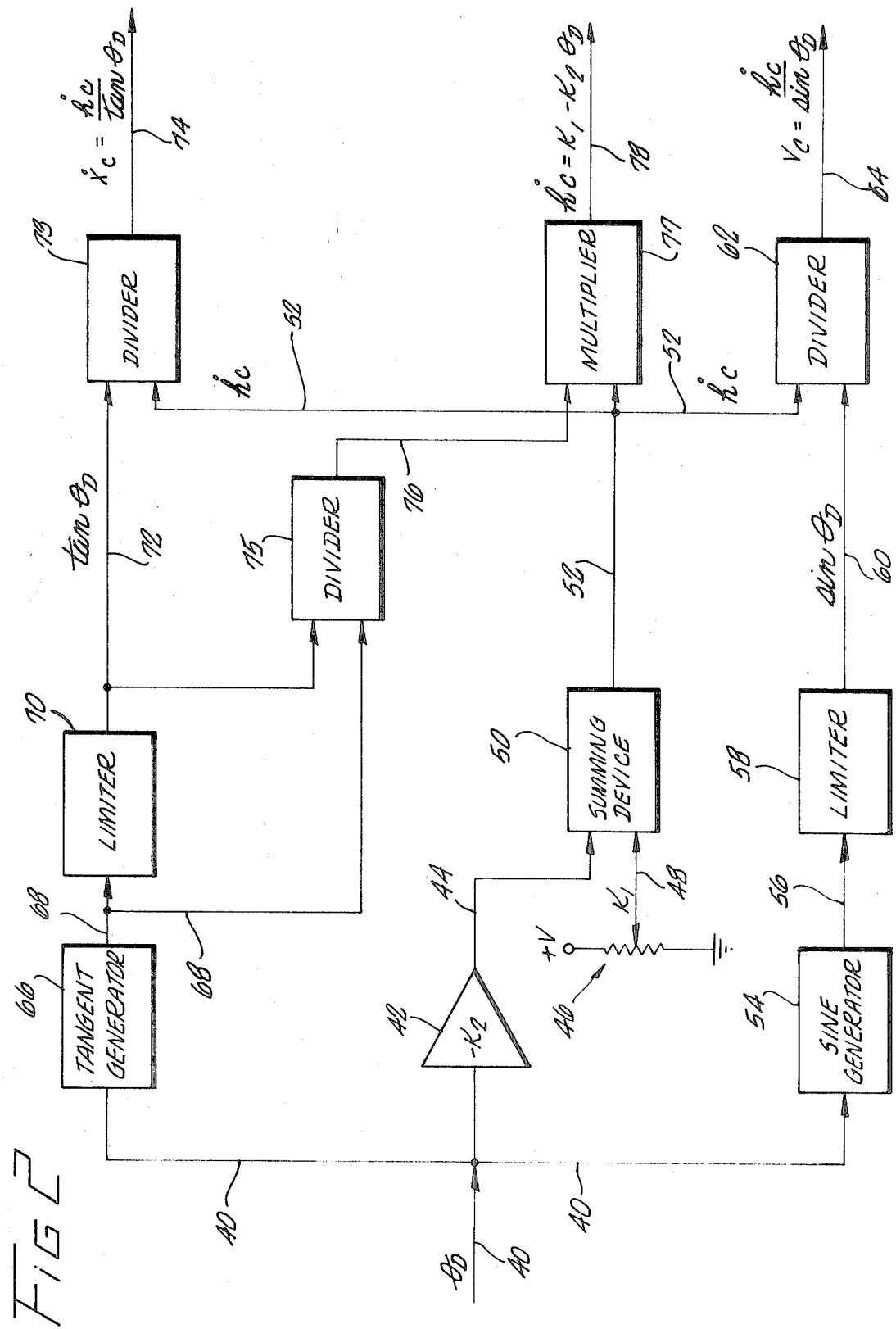

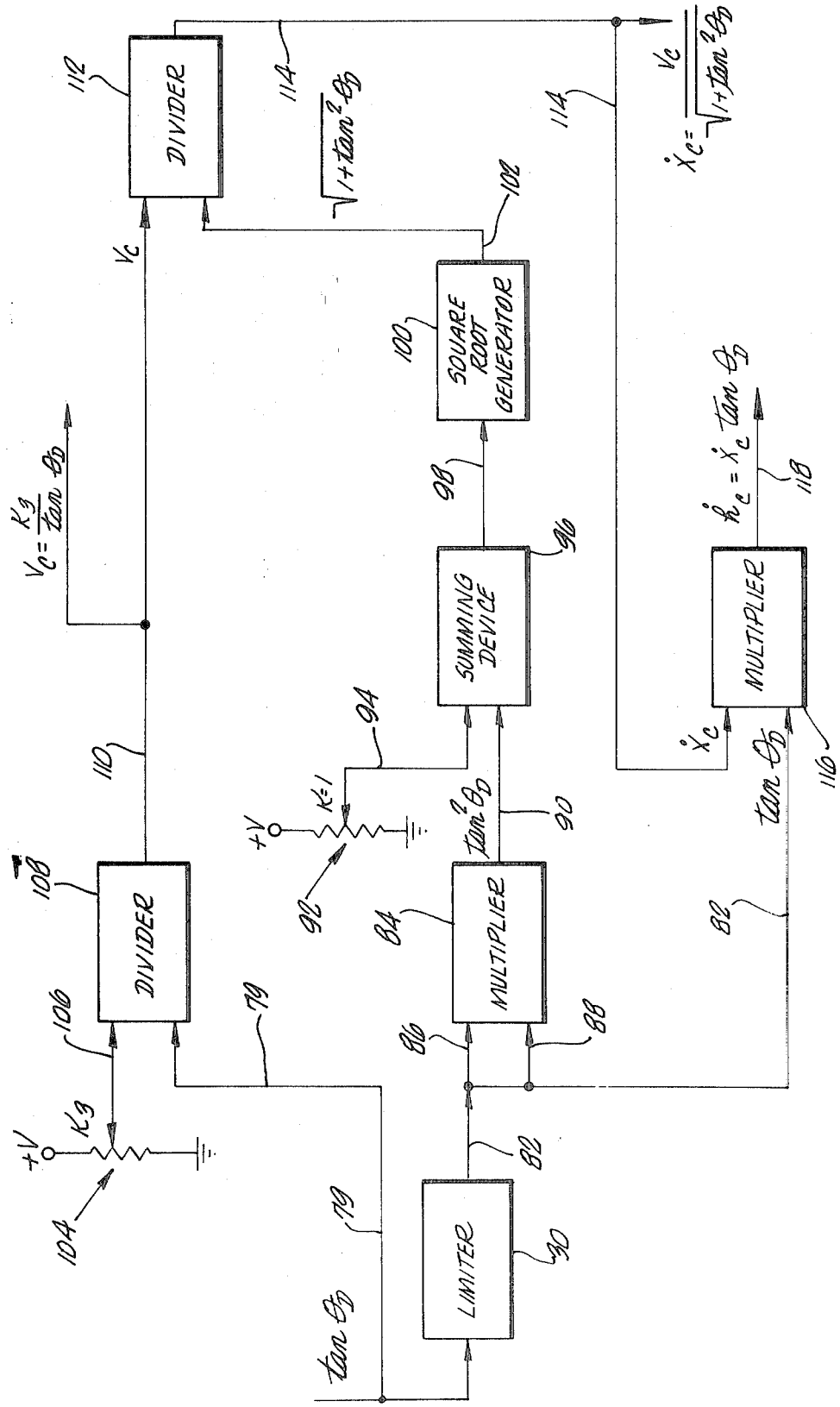

SPEED COMMAND GENERATION SYSTEM FOR VERTICAL DESCENT CONTROL

BACKGROUND OF THE INVENTION

1. Field of the Invention

This invention relates to aircraft flight control systems, and more particularly to a system for generating speed commands as a function of descent angle for use in controlling flight path of aircraft during letdown. The invention is particularly useful in controlling the vertical descent path of vertical takeoff and landing (VTOL) or vertical/short takeoff and landing (V/STOL) aircraft during transition from cruise speeds to touchdown.

2. Description of the Prior Art

In the past, a variety of aircraft flight director systems have been developed for relieving a pilot's task load during manual letdown maneuvers, or for assisting a pilot in achieving a safe terminal approach and zero-visibility landing. Generally, these systems provide a predetermined reference path usually defined by a radio beam. Actual deviation of the aircraft from the reference path beam is detected by airborne data sensors, and the flight director system computes error signals proportional to the displacement and/or rate of displacement of the aircraft from the desired path. The error signals are generally referenced to the steering controls of the aircraft and monitored on the instrument panel to assist the pilot in maneuvering the aircraft. An automatic flight control system is often coupled to flight director signals in any or all control axes to automatically fly the aircraft by actuating the aircraft controls in accordance with the magnitude of the error signals.

Actual and/or desired airspeed is commonly monitored to assist the pilot during normal cruise flight and at letdown. Further, it is often desirable to monitor aircraft speed error to determine the aircarft's deviation from a desired airspeed. In the latter situation, the pilot usually preselects a desired speed at which to fly during letdown, and the flight director system computes the difference between desired and actual airspeed. The error signal is then displayed on the instrument panel for the pilot's reference.

Vertical plane control of an aircraft during descent is ordinarily provided by a glideslope system wherein a glideslope beam defines a desired vertical descent path. During a manual landing, for example, aircraft error commands from the glideslope path are displayed on the instrument panel and the pilot flies the aircraft to reduce the error commands to zero. During an automatic landing, the flight director system determines the error of the aircraft from the glideslope path, and the errors are coupled to the aircraft controls for flying the aircraft back on the desired glideslope. During the transition from low-altitude low-speed flight to touchdown, the glideslope path becomes unreliable; that is, the path is ordinarily defined by a predetermined constant descent angle which provides no flareout command ordinarily necessary for a safe landing. Therefore, vertical descent control at low altitudes is usually provided by a variety of flaring systems which formulate vertical flight path error commands to produce a smooth transition from glideslope control to touchdown. Typically, vertical error command signals are in the form of desired flight path angles or desired descent rates. These signals are then coupled directly to a flight director system and possibly an autopilot for use in controlling the vertical descent path of the aircraft.

SUMMARY OF THE INVENTION

This invention provides a system for generating one or more speed command signals for guiding VTOL or V/STOL aircraft along a vertical descent path. At small descent angles VTOL and V/STOL aircraft are capable of maintaining relatively high speeds in a safe manner. At steep descent angles these aircraft have a very low safe speed limit. This invention provides a system capable of commanding maximum safe speeds as a function of the instantaneous angle of descent along which the aircraft is travelling.

Briefly, the invention includes an information source which develops a signal dependent upon instantaneous angle of descent of the controlled aircraft. This information source may comprise a system for producing signals proportional to the actual instantaneous descent angle of the aircraft. Alternately, the information source may comprise a guidance system which computes desired descent angles dependent upon the attitude of the aircraft. A guidance system may, for example, compute desired descent angle information as a function of the distance of the aircraft from the landing pad, or as a function of instantaneous aircraft altitude.

This invention contemplates a speed command information source responsive to instantaneous angle of descent for producing one or more aircraft speed command signals. Preferably, the command source produces speed commands in accordance with a preselected safe speed schedule which is dependent upon the characteristics of the aircraft. The speed schedule may be obtained by determining a commanded aircraft vector speed as a function of descent angle. In one preferred form of the invention, commanded vector speed $V_c$ is determined by the relationship $$V_c = \frac{K}{\tan \theta_D}$$

where $\theta_D$ is the descent angle of the controlled aircraft, and $K$ is a preselected speed value characteristic of the particular aircraft. Alternatively, an applicable speed schedule may be obtained by determining a commanded vertical descent rate which is dependent upon instantaneous descent angle. Another preferred form of the invention produces commanded vertical descent rate $\dot{h}_c$ in accordance with the relationship $\dot{h}_c = K_1 - K_2 \theta_D$ where $K_1$ and $K_2$ are preselected speed values dependent upon the characteristics of the particular aircraft. The speed command information source of this invention preferably includes a resolver device responsive to the output of the aforementioned speed schedule for producing desired vector components of the scheduled speed command signal.

The output of the speed command information source is fed to aircraft utilization means for use in controlling the vertical descent path of the aircraft. A speed command signal proportional to desired vector speed, for example, may be fed to an instrument panel display for the pilot's use in controlling descent path. Alternatively, a command in the form of desired vector sped may be fed to a flight director system for comparison with actual vector speed. Resultant speed error may then be displayed on the instrument panel. Speed command signals in the form of commanded horizontal and vertical speeds may be fed to a flight director system for comparison with actual horizontal and vertical speeds. Resultant horizontal and vertical speed error signals or position error signals may be displayed on the aircraft instrument panel, or coupled to a flight control system for automatically operating the aircraft control system.

It is to be appreciated that the present invention contemplates use of ordinarily available vertical descent information for commanding safe speeds along a vertical descent path. That is, instead of coupling descent angle information directly to a flight director system, this invention provides means for processing this information to generate safe speed commands. The resultant speed command signals may then be passed to a flight director system if desired.

Desired descent angle information available from a guidance source, for example, ordinarily describes a curve in the form of a decreasing exponential; that is, as aircraft speed decreases, the desired rate of change in the slope of the descent angle progressively decreases. The result is a descent path which provides a smooth transition from high-speed flight to touchdown. The present invention uses ordinary asymptotic angle of descent information to command smoothly varying descent speeds during letdown for safe landings. System input parameters include adjustable gain coefficients dependent upon the characteristics of the aircraft for use in commanding maximum safe speed as a function of descent angle. Even if descent angle information is in the form of a constant angle, such as from a straight line glideslope beam, an asymptotic speed schedule can be commanded by varying the above-mentioned adjustable gain coefficients, for example.

BRIEF DESCRIPTION OF THE DRAWINGS

The features of specific embodiments of the best mode contemplated of carrying out the invention are illustrated in the drawings, in which:

FIG. 1 is a block diagram showing the basic operation of the control system of this invention;

FIG. 1A is a diagrammatic representation of the geometry defining angle of descent;

FIG. 2 is a block diagram showing the operation of one preferred system for generating speed commands as a function of descent angle; and FIG. 3 is a block diagram showing the operation of an alternative preferred system for generating speed commands as a function of descent angle.

DETAILED DESCRIPTION OF SPECIFIC EMBODIMENTS

Referring to FIG. 1, a speed command generator 10 in accordance with this invention is adapted to receive descent angle information from either a descent angle signal source or sensor 12 or a selected descent angle signal source 14. Signal source 12 typically includes airborne data sensors and related computing equipment for producing a signal 16 representing an instantaneous measure of actual descent angle of the aircraft.

As shown in FIG. 1A, angle of descent $\theta_D$ is preferably defined as the angle between the true horizontal plane X and velocity vector V of the aircraft mass center M. The representation is equivalent to that typically used in the art to define aircraft "flight path angle." It is to be understood, however, that the terms "angle of descent" or "descent angle" referred generally to the slope of the descent path upon which the aircraft is travelling, and that other aircraft parameters related to "angle of descent," such as "pitch angle" or "angle of attack," for example, may in some circumstances be used as input parameters to speed command generator 10 without departing from the scope of the invention.

Signal source 14 produces a signal 18 which represents selected instantaneous descent angle. Typically, signal source 14 comprises a guidance information source or flight path computing system for producing a desired angle of descent dependent upon instantaneous position of the aircraft. For example, a flight command computer or the like may provide desired descent angle information as a function of the distance of the aircraft from a touchdown point or a reference point related to a guidance source. Alternatively, desired descent angle may be commanded as a function of instantaneous altitude of the aircraft. Speed command generator 10 receives descent angle information from the desired one of signal sources 12 and 14 depending upon the position of a switch 20.

The speed command generator 10 of this invention includes a selector means in the form of a selected speed schedule 10a for providing speed commands in response to the descent angle information provided by signal sources 12 or 14. The speed schedule provides an output speed command signal 10b which varies in accordance with the characteristics of the controlled aircraft. Preferably, the speed schedule selected provides instantaneous maximum safe speed information as a function of the angle of descent along which the aircraft is proceeding. Speed command generator 10 preferably includes a resolver 10c for resolving scheduled speed information into desired vector components. Speed command generator 10 produces an output speed command signal and/or signals 22 for use in controlling the descent of the aircraft. Depending upon the application, speed command signal 10b alone may represent the desired speed command. In this case, the position of a switch 10d would be adjusted as shown in FIG. 1 to circumvent resolver 10c. If component values of scheduled speed information are desired, switch 10d is adjusted accordingly and a resolver output signal 10e represents the speed commands.

Speed command information is fed to a variety of aircraft utilization means for controlling the vertical descent path of the aircraft. For example, an output signal 22 representative of commanded vector speed may be passed to a command display device 24 by proper adjustment of the position of a switch 26. Alternately, switch 26 may be adjusted to pass vector speed command information to a flight director system 28 for comparison with actual aircraft vector speed information from a data source 30. A resultant output signal 32 representing vector speed error may be passed to command display device 24 upon proper adjustment of a switch 34.

Resolver 10c may be scheduled to produce a vector component representing vertical speed and/or vector component representing horizontal speed. Output signal 22 representing either or both components may be fed to flight director system 28 and summed with actual measured speed in the same orientation to produce signal 32 which represents one or more speed error signals. Upon proper positioning of switch 34, the resulting error signals are fed to command display 24 for use by the pilot in controlling the aircraft. Alternately, switch 34 may be adjusted to couple the error signals to an automatic flight control system 36 which actuates an aircraft control system 38 to achieve automatic flight along the desired flight path.

A preferred information scheduling system for generating safe speed commands is shown in FIG. 2. The system illustrates the basic concept of generating speed commands from an input signal $\theta_D$ representing desired or actual angle of descent. Preferably, the speed commands generated are commanded horizontal speed $\dot{X}_c$, commanded vertical speed $\dot{h}_c$, and commanded speed vector $V_c$.

An applicable speed schedule is initially obtained by selecting a desired or commanded vertical speed $\dot{h}_c$ equal to a selected speed value $K_1$ minus the product of a selected speed value $K_2$ and descent angle $\theta_D$; that is, $$\dot{h}_c = K_1 - K_2 \theta_D.$$

As is seen from the above relationship, smooth vertical descent rates are commanded when descent angle information provides a smooth transition from high-speed flight to touchdown. The values of $K_1$ and $K_2$ can be adjusted depending upon the characteristics of the aircraft to command maximum safe speeds along the smooth descent path. A previously determined preferred speed schedule applicable to VTOL aircraft has been implemented in accordance with the following relationship:

$$\dot{h}_c = 2{,}200 - 20\theta_D \text{ (ft./sec.)}.$$

In FIG. 2 a signal 40 having a magnitude proportional to the instantaneous angle of descent $\theta_D$ is fed to an amplifier 42 having a negative gain coefficient $K_2$. Amplifier 42 produces an output signal 44 having a magnitude proportional to the value $-K_2\theta_D$. Selector means in the form of a potentiometer 46 produces an output signal 48 having a magnitude proportional to a value $K_1$. Output signals 44 and 48 are fed to a summing device 50 which produces an output signal 52 representing the algebraic sum of signals 44 and 48. Signal 52 represents commanded vertical speed $\dot{h}_c$ which equals $K_1 - K_2\theta_D$.

Signal 40 is also fed to a sine function generator 54 which produces an output signal 56 proportional to $\sin \theta_D$. Signal 56 is passed through an adjustable limit circuit 58 which limits the magnitude of an output signal 60 therefrom to a predetermined magnitude. Preferably, signal 60 is limited to values greater than sin 5° to prevent commanding extremely large speeds. Vertical speed signal 52 and signal 60 are fed to an analog division circuit 62 which produces an output signal 64 proportional to the ratio of input signal 52 to input signal 60. Output signal 64 represents commanded vector speed $V_c$ which equals $$\frac{\dot{h}_c}{\sin \theta_D}$$

Descent angle signal 40 is further passed through a function generator 66 which produces an output signal 68 proportional to tan $\theta_D$. Signal 68 is then fed through an adjustable limit circuit 70 for limiting a signal 72 therefrom to a predetermined magnitude. Preferably, output signal 72, which represents the tangent of the descent angle, is limited to values greater than tan 5° to avoid commanding extremely large speeds. Signal 72 and vertical speed signal 52 are fed to an analog divider 73 which produces an output signal 74 proportional to the ratio of signal 52 to signal 72. Division circuit output signal 74 represents commanded horizontal speed $\dot{X}_c$ which equals $$\frac{\dot{h}_c}{\tan \theta_D}$$

The system shown in FIG. 2 further includes an analog division circuit 75 which produces an output signal 76 proportional to the ratio of tangent generator output signal 68 to the limited tan $\theta_D$ signal 72. An analog multiplier circuit 77 receives vertical speed signal 52 and divider output signal 76 and produces an output signal 78 proportional to the product of signals 52 and 76. Signal 78 represents commanded vertical speed $\dot{h}_c$ equaling $K_1 - K_2 \theta_D$, and reflects the effect of the limiting of horizontal speed signal 74 and vector speed signal 64.

FIG. 3 shows means for implementing an alternate speed schedule obtained by selecting a desired commanded vector speed $V_c$ inversely proportional to the tangent of the descent angle; that is, $$V_c = \frac{K}{\tan \theta_D}$$

A previously determined preferred speed schedule applicable to VTOL aircraft has been implemented in accordance with the following relationship:

$$V_c = \frac{18.8}{\tan \theta_D} \text{ (ft./sec)}$$

As seen in FIG. 3, an input signal 79 having a magnitude proportional to the tangent of the descent angle is passed through an adjustable limit circuit 80 for limiting an output signal 82 therefrom to a predetermined magnitude. Output signal 82 is preferably limited to values above tan 5° to avoid large speed commands. An analog multiplying circuit 84 having a pair of input means 86 and 88 produces an output signal 90 proportional to the product of inputs 86 and 88. Signal 82 which represents the tangent of the descent angle is fed to multiplier inputs 86 and 88 to produce output signal 90 which represents the square of the tangent of the descent angle. A potentiometer 92 produces an output signal 94 having a magnitude representing unity. Signals 90 and 94 are fed to a summing device 96 having an output signal 98 proportional to the algebraic sum of signals 90 and 94. Signal 98 is then passed through a function generator which produces an output signal 102 proportional to the square root of input signal 98.

A potentiometer 104 produces an adjustable output signal 106 having a magnitude proportional to a value $K_3$. Signal 106 and signal 79, which represents tan $\theta_D$, are fed to an analog division circuit 108 which produces an output signal 110 proportional to the ratio of signal 106 to signal 79. Signal 110 represents commanded vector speed $V_c$ which equals $$\frac{K_3}{\tan \theta_D}$$

Signal 110 and signal 102, which represent the quantity $$\sqrt{1 + \tan^2 \theta_D}$$

are fed to a second analog division circuit 112 which produces an output signal 114 proportional to the ratio of signal 110 to signal 102. Division circuit output signal 114 represents commanded horizontal speed $\dot{X}_c$ which equals $$\frac{V_c}{\sqrt{1 + \tan^2 \theta_D}}$$

Signal 114 and signal 82, which represents tan $\theta_D$, are fed to a second analog multiplier circuit 116 which produces an output signal 118 proportional to the product of input signals 114 and 82. Multiplier output signal 118 represents the commanded vertical speed $\dot{h}_c$ which equals $\dot{X}_c \tan \theta_D$.

The present invention has been described in the context of two schedules for generating commanded speeds as a function of descent angle. It is to be understood, however, that the scope of this invention is not limited thereto. Other schemes, depending upon the particular application, can be implemented to produce speed commands as a function of descent angle without departing from the scope of this invention.

What is claimed is:

1. A system for controlling the speed of a VTOL or V/STOL aircraft during descent comprising:
   a. means for generating a signal representative of the maximum speed which is safe for the aircraft to attain at a predetermined angle of descent;
   b. means for generating a signal representative of the instantaneous angle of descent of the aircraft;
   c. scheduling means responsive to the maximum safe speed signal and the angle of descent signal for generating an airspeed command signal having a magnitude which decreases as the aircraft angle of descent increases; and
   d. aircraft utilization means responsive to the airspeed command signal for controlling the descent of the aircraft.

2. A control system according to claim 1 wherein angle of descent is the angle between the horizontal plane and the velocity vector of the aircraft mass center.

3. A control system according to claim 1 wherein the angle of descent signal represents the tangent of the angle of descent.

4. A control system according to claim 1 wherein the angle of descent signal generating means comprises selector means for computing desired angle of descent as a function of instantaneous aircraft position.

5. A control system according to claim 1 wherein the angle of descent signal generating means comprises sensor means producing a signal dependent upon actual angle of descent of the aircraft.

6. A control system according to claim 1 wherein the airspeed command signal represents instantaneous desired vector speed of the aircraft mass center.

7. A control system according to claim 6 wherein the aircraft utilization means comprises display means for monitoring said desired vector speed.

8. A control system according to claim 6 wherein the aircraft utilization means comprises:
   a. sensor means producing a signal representative of actual aircraft speed;
   b. a flight director system responsive to said airspeed command signal and said sensor means output signal for producing a speed error signal proportional to the algebraic difference between said signals; and
   c. aircraft display means for monitoring the speed error signal produced by said flight director system.

9. A control system according to claim 6 wherein the aircraft utilization means comprises:
   a. sensor means producing a signal representative of actual aircraft speed;
   b. a flight director system responsive to the sensor means output signal and the airspeed command signal for producing an output proportional to the algebraic difference between said signals; and
   c. an automatic flight control system responsive to the speed error signal produced by said flight director system for controlling the speed of the aircraft.

10. A control system according to claim 1 wherein the aircraft utilization means comprises:
    a. sensor means producing a signal representative of actual aircraft speed;
    b. a flight director system responsive to the sensor means output signal and the airspeed command signal for producing an output proportional to the algebraic difference between said signals; and c. an automatic flight control system responsive to the output of said flight director system for controlling the flight path of the aircraft in the vertical plane.

11. A control system according to claim 1 including resolver means responsive to the airspeed command signal for producing one or more command signals representing desired components of said airspeed command signal.

12. A control system according to claim 11 wherein:
 a. the airspeed command signal is representative of instantaneous desired vertical speed of the aircraft; and
 b. the resolver means command signal represents desired vector speed of the aircraft mass center.

13. A control system according to claim 11 wherein:
 a. the airspeed command signal is representative of instantaneous desired vector speed of the aircraft mass center; and
 b. the resolver means command signal represents instantaneous desired vertical speed of the aircraft.

14. A control system according to claim 13 wherein the aircraft utilization means comprises:
 a. sensor means producing a signal representative of actual vertical speed of the aircraft;
 b. a flight director system responsive to the sensor means output signal and the resolver means command signal for producing a vertical speed error signal proportional to the algebraic difference between said signals; and
 c. means responsive to said speed error signal for controlling the flight path of the aircraft in the vertical plane.

15. A control system according to claim 11 wherein:
 a. the airspeed command signal is representative of instantaneous desired vector speed of the aircraft mass center; and
 b. the resolver means command signal represents instantaneous desired horizontal speed of the aircraft.

16. A control system according to claim 15 wherein the aircraft utilization means comprises:
 a. sensor means producing a signal representative of actual horizontal speed of the aircraft;
 b. a flight director system responsive to the sensor means output signal and the resolver means command signal for producing a horizontal speed error signal proportional to the algebraic difference between said signals; and
 c. means responsive to said speed error signal for controlling the flight path of the aircraft in the vertical plane.

17. A control system according to claim 1 wherein the airspeed command signal has a magnitude $V_c$ representing commanded aircraft vector speed, the signal varying in accordance with the relation $$V_c = \frac{K}{\tan \theta_D}$$

where $K$ represents a variably assigned speed value dependent upon the characteristics of the aircraft, and $\tan \theta_D$ represents the tangent of angle of descent of the aircraft.

18. A control system according to claim 17 wherein the scheduling means includes resolver means responsive to output signal $V_c$ for producing a second output signal $\dot{X}_c$ representing commanded horizontal speed of the aircraft, the second signal varying in accordance with the relation $$\dot{X}_c = V_c \frac{1}{\sqrt{1+\tan^2 \theta_D}}$$

19. A control system according to claim 17 wherein the scheduling means includes resolver means responsive to output signal $V_c$ for producing a second output signal $\dot{h}_c$ representing commanded vertical speed of the aircraft, the second signal varying in accordance with the relation $\dot{h}_c = \dot{X}_c \tan \theta_D$, where $\dot{X}_c$ represents commanded horizontal speed of the aircraft.

20. A control system according to claim 1 wherein the airspeed command signal has a magnitude $\dot{h}_c$ representing commanded vertical speed of the aircraft, the output signal varying in accordance with the relation $\dot{h}_c = K_1 - K_2 \theta_D$, where $K_1$ and $K_2$ equal variably assigned speed values representative of the characteristics of the aircraft.

21. A control system according to claim 20 wherein the scheduling means includes resolver means responsive to the output signal $\dot{h}_c$ for producing a second output signal $V_c$ representing commanded aircraft vector speed, the second signal varying in accordance with the relation $$V_c = \frac{\dot{h}_c}{\sin \theta_D}$$

where $\sin \theta_D$ equals the sine of the angle of descent of the aircraft.

22. A control system according to claim 20 wherein the scheduling means includes resolver means responsive to the output signal $\dot{h}_c$ for producing a second output signal $\dot{X}_c$ representing commanded horizontal speed of the aircraft, the second signal varying in accordance with the relation $$\dot{X}_c = \frac{\dot{h}_c}{\tan \theta_D}$$

23. A system for controlling the speed of an aircraft comprising:
 a. a first signal source having an output representative of instantaneous angle of descent of said aircraft;
 b. a second signal source which includes selector means responsive to the output of the first signal source for producing an output signal $V_c$ representing commanded aircraft vector speed, the output signal varying in accordance with the relation $$V_c = \frac{K}{\tan \theta_D}$$

where $K$ represents a variably assigned speed value dependent upon the characteristics of the aircraft, and $\tan \theta_D$ represents the tangent of the angle of descent of the aircraft; and
 c. aircraft utilization means responsive to the output of the second signal source for controlling the descent path of the aircraft.

24. A control system according to claim 23 wherein the second signal source further includes resolver means responsive to output signal $V_c$ for producing a second output signal $\dot{X}_c$ representing commanded horizontal speed of the aircraft, the second signal varying in accordance with the relation $$\dot{X}_c = V_c \frac{1}{\sqrt{1+\tan^2 \theta_D}}$$

25. A control system according to claim 23 wherein the second signal source further includes resolver means responsive to output signal $V_c$ for producing a second output signal $\dot{L}_c$ representing commanded vertical speed of the aircraft, the second signal varying in accordance with the relation $\dot{h}_c = \dot{X}_c \tan \theta_D$, where $\dot{X}_c$ represents commanded horizontal speed of the aircraft.

26. A system for controlling the speed of an aircraft comprising:
 a. a first signal source having an output representative of instantaneous angle of descent of said aircraft;
 b. a second signal source comprising:
  1. first division means responsive to a first input and a second input for producing an output signal proportional to the ratio of the first input to the second input;
  2. adjustable selector means producing an output signal representing a variably assigned speed value dependent upon the characteristics of the aircraft;
  3. means connecting the output signal from said selector means to the first input of the first division means; and
  4. means for connecting the output of the first signal source to the second input of the first division means, the output signal from the first division means being representative of commanded vector speed of the aircraft mass center; and c. aircraft utilization means responsive to the output of the second signal source for controlling the descent path of the aircraft.

27. A control system according to claim 26 including:
a. first multiplier means responsive to a first input and a second input for producing an output signal proportional to the product of the first and second inputs;
b. means connecting the output of the first signal source to the first and second inputs of said first multiplier means;
c. selector means producing an output signal having a magnitude representing unity;
d. summing means responsive to said selector means output signal and the output signal of said first multiplier means for producing an output signal proportional to the sum of said signals;
e. a function generator responsive to an input for producing an output signal proportional to the square root of said input;
f. means connecting the output signal of said summing means to the input of said function generator;
g. second division means responsive to a first input and a second input for producing an output signal proportional to the ratio of the first input to the second input;
h. means connecting the output signal from the first division means to the first input of the second division means; and
i. means connecting the output signal from said function generator to the second input of the second division means, the output signal from the second division means being representative of commanded horizontal speed of the aircraft.

28. A control system according to claim 26 including:
a. second multiplier means responsive to a first input and a second input for producing an output signal proportional to the product of the first and second inputs;
b. means connecting the output from the first signal source to the first input of said second multiplying means; and
c. means connecting the output signal from said second division means to the second input of said second multiplying means, the output of the second multiplying means being representative of commanded vertical speed of the aircraft.

29. A system for generating safe speed commands for VTOL and V/STOL aircraft comprising:
a. means for generating a variable signal representative of a selected angle of descent of the aircraft and independent of actual angle of descent of the aircraft;
b. means responsive to the variable selected angle of descent signal for generating a speed command signal representative of substantially the maximum speed which is safe for the aircraft to attain when flying at said selected angle of descent, said speed command signal being independent of the actual angle of descent of the aircraft; and
c. aircraft utilization means responsive to the speed command signal for controlling the descent of the aircraft.

30. Apparatus according to claim 29 wherein the magnitude of the speed command signal increases as the magnitude of said selected angle of descent decreases.

* * * * *

UNITED STATES PATENT OFFICE
CERTIFICATE OF CORRECTION

Patent No. 3,627,238      Dated December 14, 1971

Inventor(s)     BRUCE E. MENN

It is certified that error appears in the above-identified patent and that said Letters Patent are hereby corrected as shown below:

Abstract, line 1, "vtol or vistol" should read --VTOL or V/STOL--

Col. 1, line 35, "aircarft's" should read --aircraft's--.

Col. 7, line 73 (Claim 19) "$\dot{h}_c$"$\dot{X}_c$" should read --$\dot{h}_c = \dot{X}_c$--.

Col. 8, line 57 (Claim 25) "$L_c$" should read --$V_c$--;

Col. 8, line 58      "$h_c = X_c$" should read --$\dot{h}_c = \dot{X}_c$--;

Col. 8, line 59      "$X_c$" should read --$\dot{X}_c$--.

Signed and sealed this 26th day of December 1972.

(SEAL)
Attest:

EDWARD M. FLETCHER, JR.      ROBERT GOTTSCHALK
Attesting Officer      Commissioner of Patents